June 5, 1945.  D. R. MOON  2,377,802
DRAGLINE APPARATUS
Filed Dec. 21, 1943  3 Sheets-Sheet 1

Inventor
Dennis R. Moon

By Clarence A. O'Brien
and Harvey B. Jacobson
Attorneys

June 5, 1945. D. R. MOON 2,377,802
DRAGLINE APPARATUS
Filed Dec. 21, 1943 3 Sheets-Sheet 2
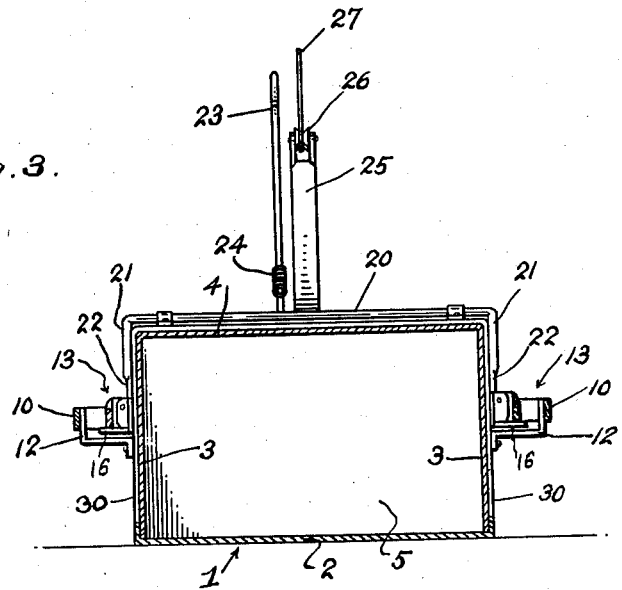
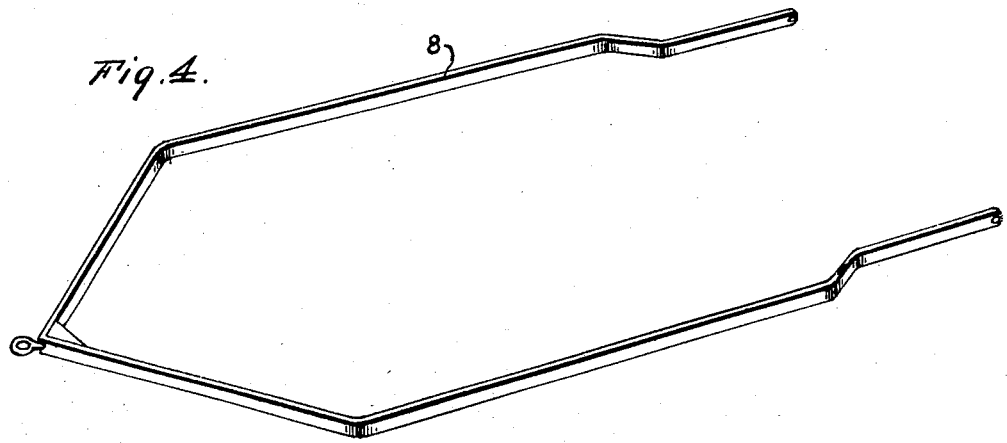
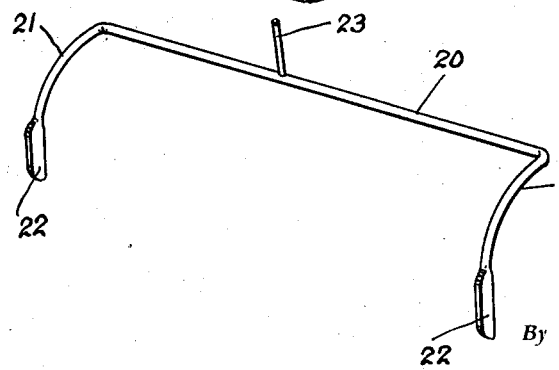
Inventor
Dennis R. Moon
By Clarence A. O'Brien
and Harvey B. Jacobson
Attorneys June 5, 1945.  D. R. MOON  2,377,802
DRAGLINE APPARATUS
Filed Dec. 21, 1943  3 Sheets-Sheet 3

Inventor
Dennis R. Moon
By Clarence A. O'Brien
and Harvey B. Jacobson
Attorneys

Patented June 5, 1945

2,377,802

UNITED STATES PATENT OFFICE 2,377,802

DRAGLINE APPARATUS

Dennis R. Moon, Napa, Calif.

Application December 21, 1943, Serial No. 515,165

4 Claims. (Cl. 37—117)

The present invention relates generally to new and useful improvements in drag line machinery, and has for one of its important objects to provide, in a manner as hereinafter set forth, an apparatus of this character comprising a bucket including a unique combination and arrangement for connecting thereto the operating lines.

Another very important object of the invention is to provide, in a drag line apparatus of the aforementioned character, a bucket comprising novel dump control means.

Other objects of the invention are to provide a drag line apparatus of the character described which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a cross sectional view, taken substantially on the line 3—3 of Figure 1.

Figure 4 is a perspective view of the bucket bail.

Figure 5 is a perspective view of the lock-retaining means.

Figure 1:
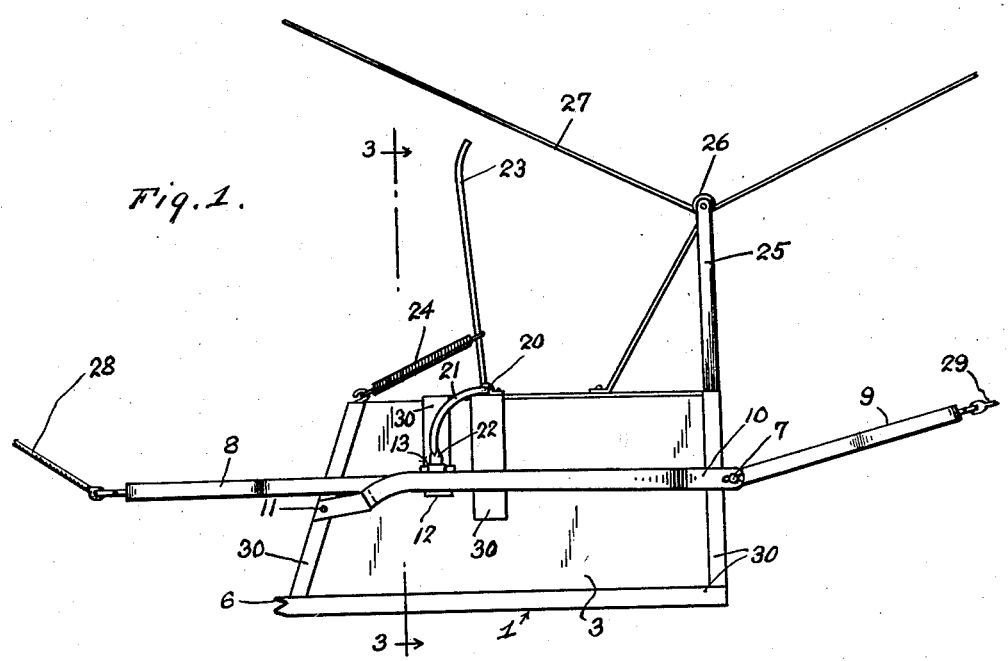
Figure 1 is a view in side elevation, of a drag line bucket constructed in accordance with the present invention.
Figure 2:
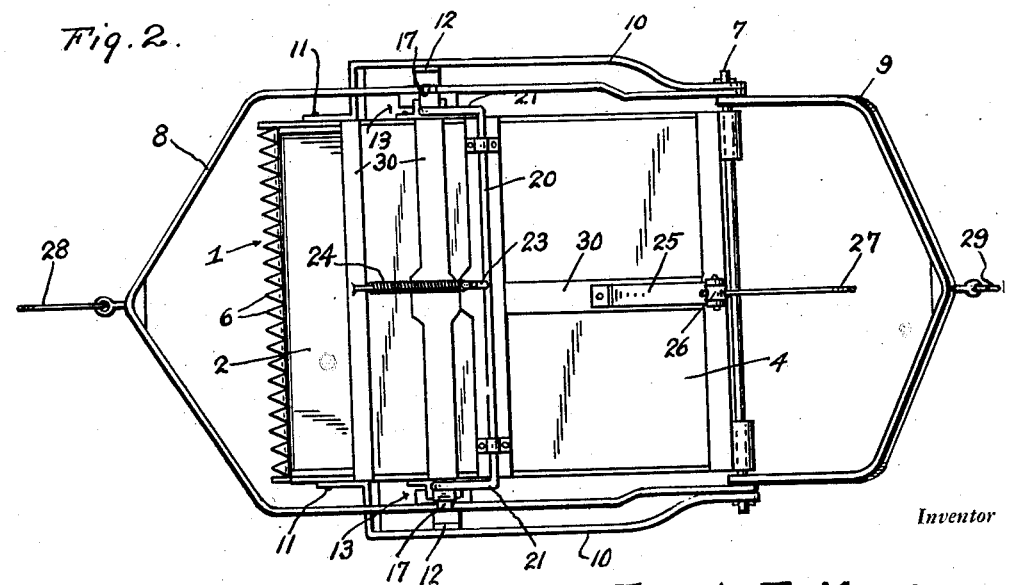
Figure 2 is a top plan view thereof.
Figure 6:
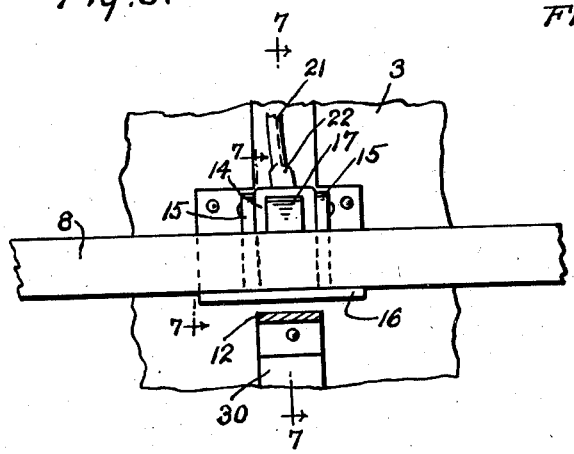
Figure 6 is a vertical sectional view, taken substantially on the line 6—6 of Figure 7, showing one of the locks in side elevation.
Figure 7:
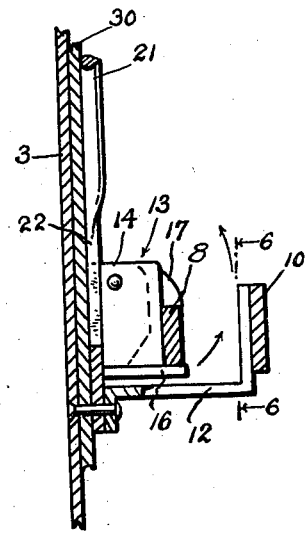
Figure 7 is a vertical sectional view, taken substantially on the line 7—7 of Figure 6.
Figure 8:
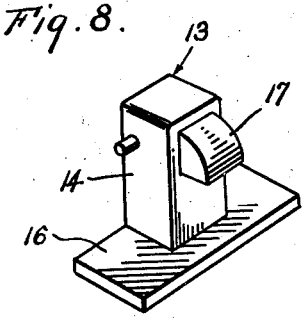
Figure 8 is a perspective view of one of the locks.
Figure 9:
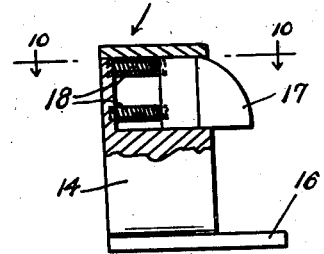
Figure 9 is a view principally in vertical section through one of the locks.
Figure 10:
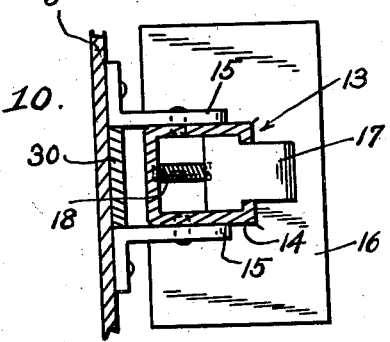
Figure 10 is a view in horizontal section, taken substantially on the line 10—10 of Figure 9, but including a portion of the bucket, et cetera.
Figure 11:
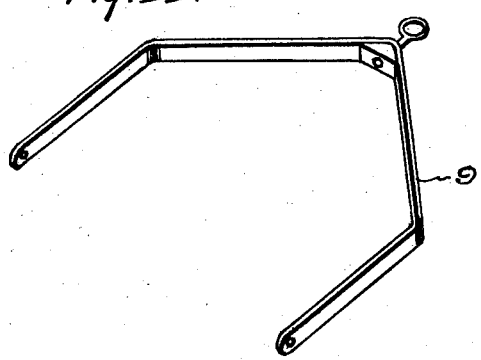
Figure 11 is a perspective view of the rear bail.

Referring to the drawings in detail, it will be seen that the embodiment of the invention which has been illustrated comprises a metallic bucket of suitable dimensions which is designated generally by reference numeral 1, said bucket being open at its front end only. The bucket 1 includes a bottom 2, sides 3, a top 4 and a rear end 5. The forward end of the bottom 2 is provided with teeth 6. Metallic bars 30 reinforce or strengthen the bucket 1.

Mounted horizontally on the rear end 5 of the bucket 1 is a transverse rod 7 which projects beyond the sides of said bucket. Front and rear bails 8 and 9, respectively, of flat stock are journaled on the end portions of the rod 7. The rear end portions of bars 10 are also mounted on the rod 7. The bars 10 extend forwardly from the rod 7 in spaced relation to the side walls 3 of the bucket 1 and have their forward end portions secured to said bucket, as at 11. Brackets 12 on the side walls 3 of the bucket are also provided for the side bars 10 adjacent the forward ends thereof.

Locks 13 are provided for the bail 8 on the sides 3 of the bucket 1 just above the brackets 12. The locks 13 comprise keepers 14 which are journaled for vertical swinging movement between pairs of brackets 15 on the bucket 1. Stops 16 are provided on the lower ends of the keepers 14. Bolts 17 are slidably mounted in the upper portions of the keepers 14. Springs 18 project the bolts 17 from the keepers 14. The legs of the bail 8 are engageable with the plates 16 beneath the bolts 17 of the keepers 14 for releasably securing the bucket 1 in raised position.

Journaled transversely on the top 4 of the bucket 1 is a rockable shaft 20. The shaft 20 is provided, on its ends, with arcuate arms 21 which terminate in flattened end portions 22 constituting stops which are engageable behind the keepers 14 in a manner to positively secure said keepers against swinging movement on the brackets 15. Rising from the shaft 20 at an intermediate point is a lever 23. A coil spring 24 is connected to the lever 23 for engaging the stops 22 between the keepers 14 and certain of the reinforcing bars 30 on the side walls 3 of the bucket 1.

Rising from the rear portion of the bucket 1 is a stand 25 having mounted thereon a pulley 26. The pulley 26 is operable on a suspension line 27. Front and rear drag lines 28 and 29, respectively, are connected to the bails 8 and 9.

It is thought that the operation of the invention will be readily apparent from a consideration of the foregoing. Briefly, when the stops 22 are engaged behind the locks 13, said locks secure the bucket 1 against swinging movement on the bail 8 while said bucket is being filled and moved to the point of discharge. When the bucket reaches the point at which it is to be dumped, the lever 23 engages a suitable obstruction and is actuated thereby against the tension of the spring 24. Thus, the elements 22 are withdrawn from behind the keepers 14. When this occurs, the forward end of the bucket 1 swings downwardly for dumping, the keepers 14 swinging upwardly under the bail 8. After the locks 13 pass and are free of the bail 8, the keepers 14 swing downwardly to their normal position by gravity and the spring 24 engages the elements 22 therewith. After the dumping operation, the bail 8 is swung downwardly to again pick up the front end of the bucket. During this movement the plates 19 retract the bolts 17 against the tension of the coil springs 18 and come to rest on the stops 16. The springs 18 then project the bolts 17 over the bail 8 for again connecting the front end of the bucket 1 to said bail.

It is believed that the many advantages of a drag line bucket constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A drag line apparatus comprising a bucket, a rod mounted transversely on and directly behind the rear end of the bucket, front and rear bails journaled on said rod, the front rail straddling the bucket, a load pulling line attached to said front bail, a return line attached to the rear bail, and means releasably securing the front bail to the bucket against swinging movement.

2. A drag line apparatus comprising an elongated bucket open at its front and closed at its rear end, a bail pivotally mounted on the bucket, locks releasably securing the bail to the bucket against swinging movement, said locks including keepers journaled for vertical swinging movement on the bucket, stops on the keepers engageable beneath the bail, spring-pressed bolts slidable on the keepers and engageable over the bail, and means for releasably securing the keepers against swinging movement in engagement with the bail.

3. A drag line apparatus comprising an elongated bucket open at its front end and closed at its rear end, a bail pivotally mounted on the bucket, locks releasably securing the bail to the bucket against swinging movement, said locks including keepers journaled for vertical swinging movement on the bucket, stops on the keepers engageable beneath the bail, spring-pressed bolts slidable on the keepers and engageable over the bail, and means for releasably securing the keepers against swinging movement in engagement with the bail, said means including a shaft rockably mounted on the bucket, an operating lever on the shaft, arms on the ends of the shaft engageable with the keepers for securing said keepers against swinging movement, and a spring for actuating the shaft for engaging the arms with the keepers.

4. A drag line apparatus comprising an elongated bucket open at its front and closed at its rear end, a rod mounted transversely on the rear end of the bucket, front and rear bails journaled on the rod, said bails for connection with drag lines, a stand rising from the bucket, a pulley on the stand operable on a suspension cable, and means for releasably securing the front bail to the bucket against swinging movement.

DENNIS R. MOON.